Patented Aug. 24, 1948

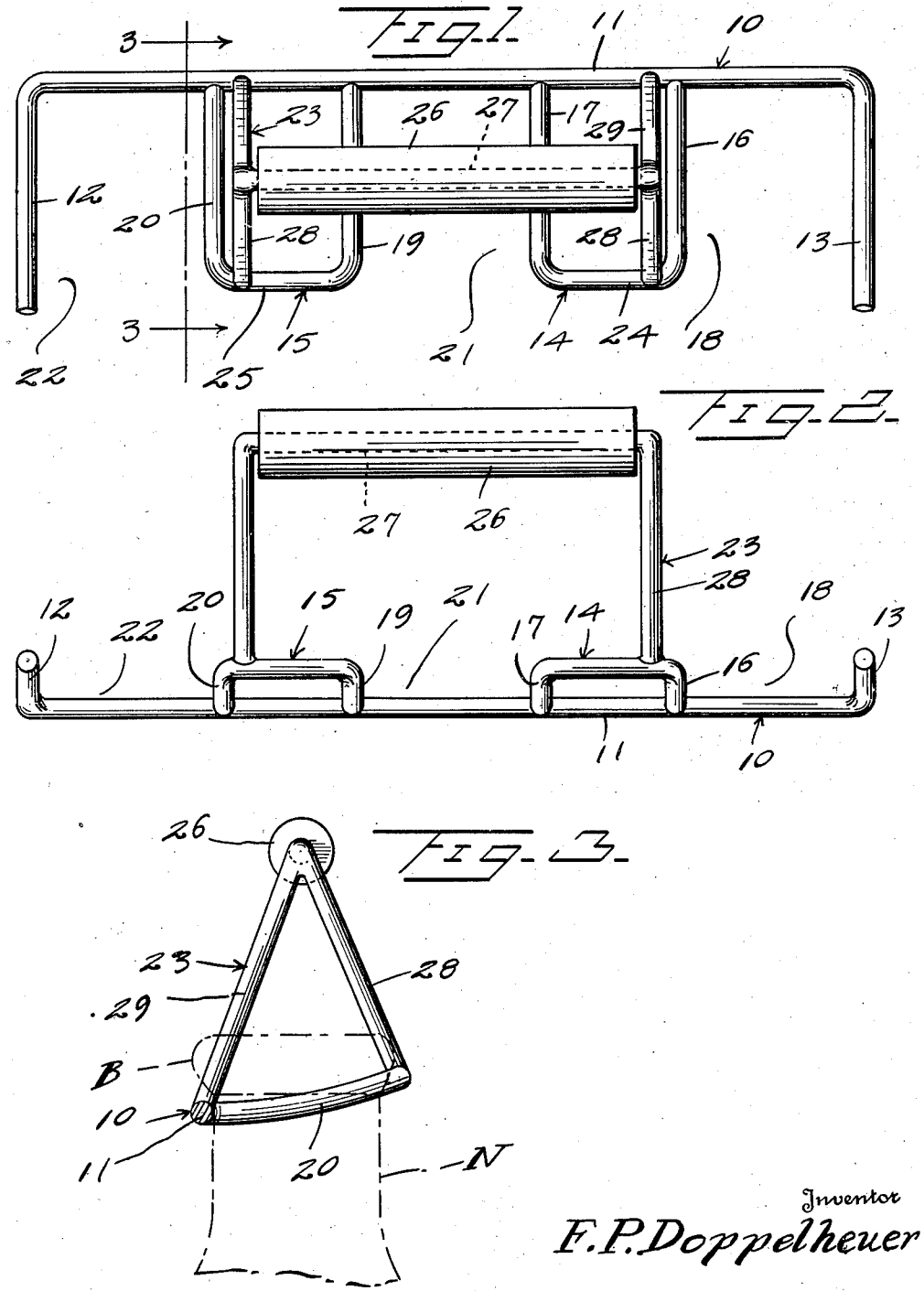

2,447,934

UNITED STATES PATENT OFFICE 2,447,934

BOTTLE CARRIER

Frank P. Doppelheuer, Connellsville, Pa., assignor of one-half to James D. Doppelheuer, Connellsville, Pa.

Application April 15, 1946, Serial No. 662,184

4 Claims. (Cl. 224—45)

This invention relates to bottle carriers.

An object of this invention is to provide a bottle carrier of simple, sturdy construction for suspendingly carrying a number of milk bottles which can be easily and quickly engaged with and separated from the bottles.

Another object of this invention is to provide a bottle carrier which includes a U-shaped rigid member having the legs thereof upwardly curved, a pair of reversely disposed U-shaped members fixed at the ends of the legs thereof to the bight of the first U-shaped member, an upstanding bail of U-shape fixed at the ends of the legs thereof to the bights of the pair of U-shaped members and inclined upwardly and inwardly, and a pair of bracing bars fixed to the bail and the bight of the first U-shaped member.

With the above and other objects in view, my invention consists in the arrangement, combination and details of construction disclosed in the drawings and specification, and then more particularly pointed out in the appended claims.

In the drawings,

Wherein similar characters designate similar parts throughout the respective views, Figure 1 is a detail top plan of a bottle carrier constructed according to the embodiment of this invention, Figure 2 is a detail front elevation of the device, Figure 3 is a sectional view taken on the line 3—3 of Figure 1.

Referring to the drawings, numeral 10 designates generally a U-shaped member which is formed with a relatively long bight portion 11 and relatively short legs 12 and 13. The legs 12 and 13 are upwardly curved as shown more clearly in Figure 3, the purpose for which will hereinafter be described. The U-shaped member 10 has fixed to the bight 11 thereof, a pair of reversely disposed U-shaped members 14 and 15. The U-shaped member 14 has the legs 16 and 17 thereof secured to the bight 11 inwardly from the leg 13 so as to thereby form a bottle neck space 18.

The space between legs 13 and 16 is sufficient to freely receive the neck end of a milk bottle so that the bead B at the top of the neck will engage the legs 13 and 16 and also that portion of the bight 11 of the member 10 which is disposed between the two legs 13 and 16. The U-shaped member 15 has the legs 19 and 20 thereof fixed to the bight 11 of the U-shaped member 10, and the legs 19 and 20 are also upwardly curved.

The U-shaped member 15 forms, with the U-shaped member 14, a bottle neck space 21 within which the neck of the bottle is adapted to be received when bead B engages the legs 17 and 19 and that portion of the bight 11 which is positioned between these legs. The legs 20 of the U-shaped member 15 forms, with the leg 12, a third bottle receiving space 22 with the bead of the bottle engaging the legs 12 and 20 and that portion of the bight 11 between these legs.

A U-shaped bail 23 is fixed to the bight 11 of the U-shaped member 10. The bail 23 extends upwardly and inwardly and has a handle 26 mounted on the bight 27 thereof. The bail 23 is braced with respect to the U-shaped member 10 by means of upwardly and inwardly inclined bracing bars 28 which are fixed at their lower end to the bights 24 and 25 and are fixed at their upper ends to the junction between bight 27 of the bail 23 and the legs 29 of the bail.

In the use of this carrier, the bottles may be lifted from the crate by inserting the carrier beneath the beads of the bottles and then swinging the carrier inwardly to position the necks of the bottles in spaces 18, 21 and 22. The bottles may then be lifted from the crate and carried to the desired position, and the releasing operation can be performed by merely setting the bottles on a support and swinging the carrier in the reverse direction from the insertion operation.

The spaces 18, 21 and 22 are preferably spaced apart a distance substantially equal to the space between the bottles when positioned in the crate so that this carrier can be used to lift the bottles from the crate without manually inserting the bottles in the receiving spaces. This carrier can be made out of rigid bar material so as to be strong, and being of simple, sturdy construction, will withstand hard usage without becoming bent or otherwise distorted.

I do not mean to confine myself to the exact details of construction herein disclosed but claim all variations falling within the purview of the appended claims.

What I desire to claim is:

1. A bottle carrier comprising a U-shaped member having a substantially long bight and relatively short legs with the legs upwardly bowed, a pair of reversely disposed U-shaped members disposed between the legs of said first member and having the legs thereof upwardly bowed and the ends of the legs thereof fixed to the bight of said first member intermediate the length thereof, an inverted U-shaped bail fixed to the bight of said first member and extending upwardly and inwardly therefrom, and a pair of bracing bars fixed between said bail and the bights of said pair of U-shaped members, the legs of said bail being longer than said bracing bars to thereby provide for disposing the legs of said first and said pair of U-shaped members on an angle to the horizontal inclined downwardly toward the bight of said first member whereby the legs of said first and said pair of U-shaped members will be inclined to the horizontal with said long bight lowermost.

2. A bottle carrier comprising a U-shaped member having a relatively long bight and relatively short legs with the legs bowed upwardly and outwardly from said bight, at least one reversely disposed intermediate U-shaped member between the legs of said first member, the legs of said intermediate member fixed at their ends to the bight of said first member intermediate the length thereof and bowed upwardly and outwardly, a U-shaped bail fixed to the bight of said first member, bracing arms between said bail and the outer ends of said intermediate members, said latter arms being shorter than the arms of said bail whereby the arms of said first member and said intermediate members will be downwardly inclined toward the bight of said first member for biasing bottles carried therebetween toward the bight of said first member retainingly.

3. A bottle carrier comprising a rear bar member, forwardly extending legs on said bar, said legs being bowed upwardly and outwardly from said bar, a bail having a horizontal bar fixed between the rear bar and the outer ends of said arms, said horizontal bar being disposed in closer proximity to the ends of said arms than to said rear bar, whereby the bead of a bottle will engage a pair of adjacent bars at one point along the length thereof and said rear bar will engage the neck of the bottle below said bead, the weight of said bottle on said arms biasing the bottle toward said rear bar.

4. A bottle carrier comprising a rear bar, forwardly extending spaced apart bottle engaging legs on said bar, said legs being bowed upwardly and outwardly from said bar whereby the bead of said bottle will contact a pair of adjacent arms at one point on each arm above the horizontal plane of said rear bar, and the neck of the bottle below said bead will engage said rear bar.

FRANK P. DOPPELHEUER.

REFERENCES CITED

The following references are of record in the file of this patent:

UNITED STATES PATENTS

| Number | Name | Date |
|---|---|---|
| 1,461,621 | Kranzl | July 10, 1923 |
| 1,474,322 | Ducorron | Nov. 13, 1923 |
| 2,067,124 | Hoffman | Jan. 5, 1937 |